US008549621B2

(12) United States Patent  (10) Patent No.: US 8,549,621 B2
Kawara  (45) Date of Patent: Oct. 1, 2013

(54) CLIENT APPARATUS AND A METHOD THEREFOR

(75) Inventor: Satoshi Kawara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 280 days.

(21) Appl. No.: 12/975,050

(22) Filed: Dec. 21, 2010

(65) Prior Publication Data

US 2011/0162065 A1 Jun. 30, 2011

(30) Foreign Application Priority Data

Dec. 28, 2009 (JP) ................................ 2009-298621

(51) Int. Cl.
G06F 7/04 (2006.01)
(52) U.S. Cl.
USPC ......................................................... 726/17
(58) Field of Classification Search
USPC ............ 726/4, 17, 21; 707/705–789, 813–31
See application file for complete search history.

(56) References Cited

U.S. PATENT DOCUMENTS 7,346,769 B2 * 3/2008 Forlenza et al. .............. 713/151
2003/0189722 A1 10/2003 Yoshikawa
2006/0080316 A1 * 4/2006 Gilmore et al. .................. 707/9

FOREIGN PATENT DOCUMENTS

JP 2003-296068 A 10/2003

OTHER PUBLICATIONS

Portable Document Format Reference Manual Version 1.2.

* cited by examiner

Primary Examiner — Tonia L Dollinger
Assistant Examiner — Davoud Zand
(74) Attorney, Agent, or Firm — Canon USA Inc IP Division

(57) ABSTRACT

To limit access to a document according to a plurality of types of access authorities set to the document when a server apparatus for limiting access to the document having a setting of a plurality of types of access authorities to operate the document cannot limit access to the document according to the access authority, an apparatus includes a conversion unit configured to convert a document into a plurality of documents having a setting corresponding to each of the plurality of types of access authorities, and a generation unit configured to merge the plurality of documents formed through conversion by the conversion unit, so as to be handled as one document, to generate one merged document.

6 Claims, 22 Drawing Sheets

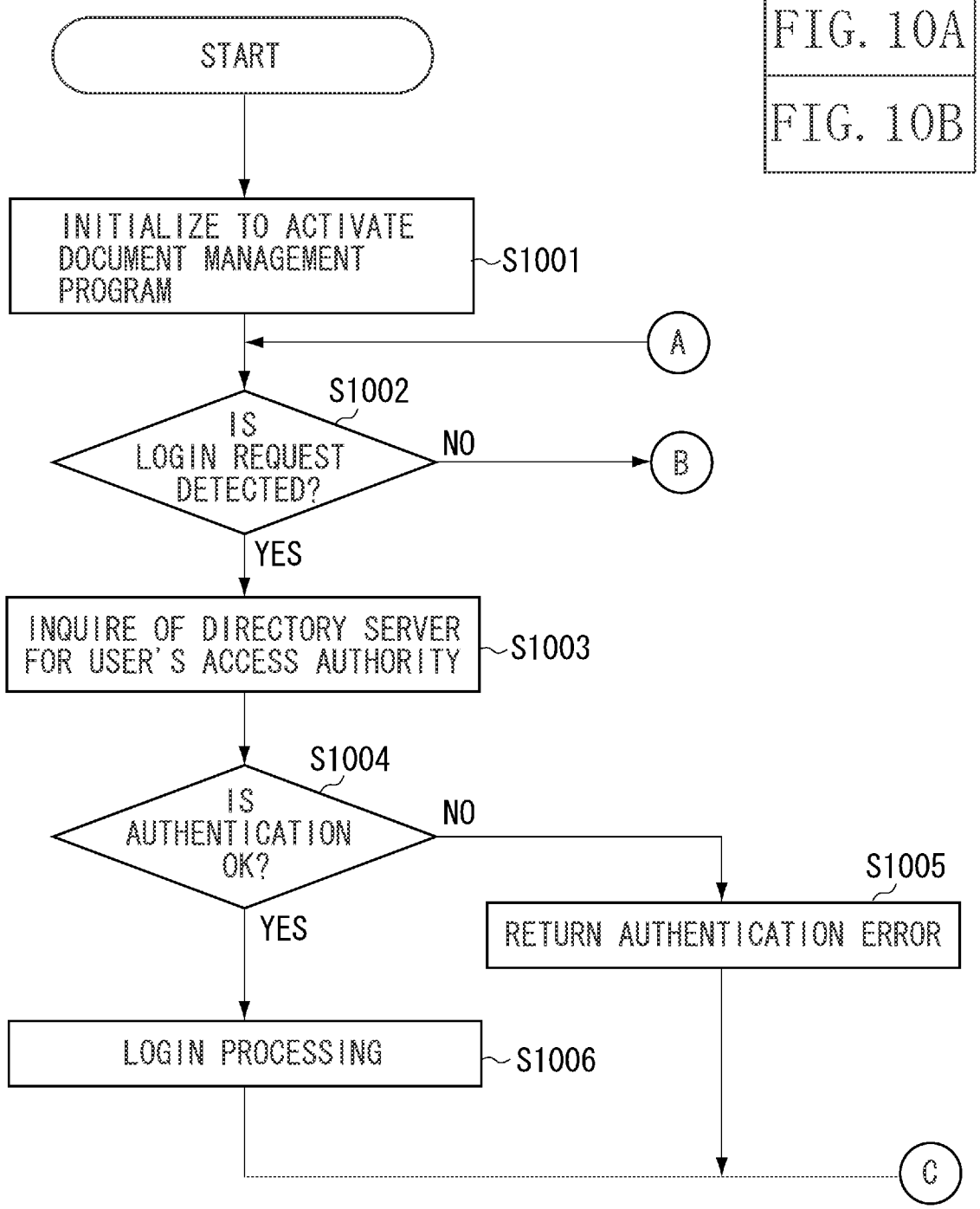

FIG. 11A

ACCESS AUTHORITIES SET FOR VIRTUAL POLICY "CONFIDENTIAL TO OUTSIDE THE DEPARTMENT"

| ACCESS AUTHORITY \ USER GROUP | POLICY SETTER (VARIABLE) | MEMBER OF POLICY SETTER'S DEPARTMENT (VARIABLE) | OTHER USERS |
|---|---|---|---|
| VIEWING | ○ | ○ | × |
| EDITING | ○ | × | × |
| PRINTING | ○ | ○ | × |
| TRANSMITTING (FOR DEVICE ONLY) | ○ | ○ | × |

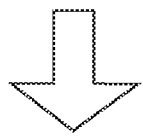

POLICY CONVERSION WHEN "SUZUKI", A MEMBER OF THE SALES SECTION I, SELECTS VIRTUAL POLICY "CONFIDENTIAL TO OUTSIDE THE DEPARTMENT"

FIG. 11B

ACCESS AUTHORITIES SET FOR REAL POLICY "CONFIDENTIAL TO OUTSIDE SALES DEPARTMENT I"

| ACCESS AUTHORITY \ USER GROUP | SUZUKI (POLICY SETTER) | MEMBER OF SALES DEPARTMENT I (MEMBER) | OTHER USERS |
|---|---|---|---|
| VIEWING | ○ | ○ | × |
| EDITING | ○ | × | × |
| PRINTING | ○ | ○ | × |
| TRANSMITTING (FOR DEVICE ONLY) | ○ | ○ | × |

2009/06/01 15:58:08 Open
2009/06/01 16:00:88 Edit
2009/06/01 16:05:15 Print
2009/06/05 15:54:53 Open

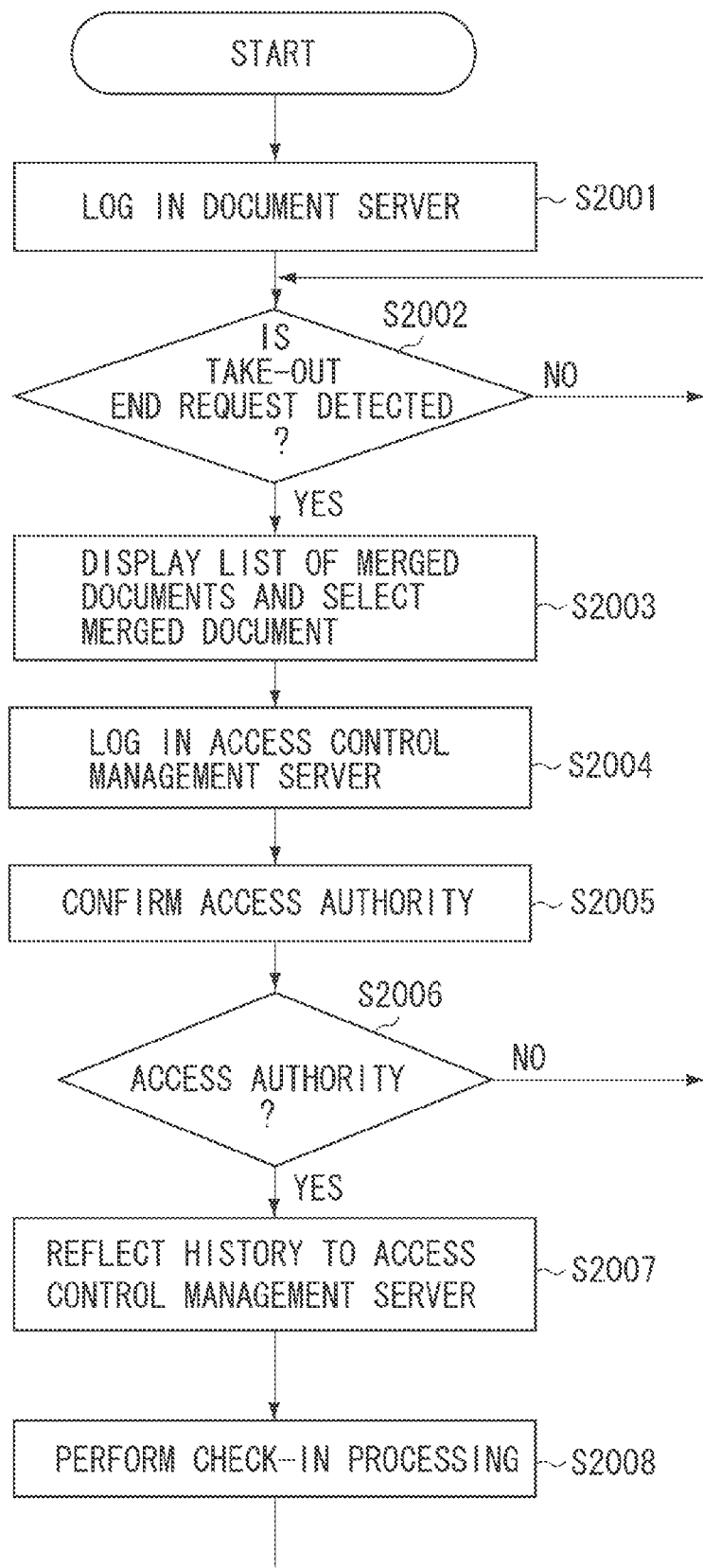

CLIENT APPARATUS AND A METHOD THEREFOR

BACKGROUND OF THE INVENTION

1. Field of the Invention

The present invention relates to a technique for controlling authorities to operate a document.

2. Description of the Related Art

With the increase in consciousness on information security in recent years, there has been in companies a demand for measures for minimizing the risk of information leakage from the viewpoint of the personal information protection law and the protection of intellectual properties. To meet this demand, there has been provided a system capable of minimizing the risk of information leakage by setting access authorities and operating authorities for specific users to each document (electronic document) as a security policy (hereinafter simply referred to as policy).

For example, an access control management server has been put on the market. Various types of access control (whether viewing, editing, and printing are possible or not) for each individual user can be set to a file (document) via the access control management server. Further, access control is possible for a distribution file when a file author specifies detailed control levels for each individual user.

As an exemplary access control management server, Adobe has announced Live CyclePolicy Server which enables access control for portable document format (PDF) documents. Access authorities for policies registered in the access control management server can be set for each user or group, on a time slot basis, and on a network or domain basis. Settable operating authorities include the viewing, printing, and editing authorities (whether viewing, printing, and editing are possible or not).

Even after distributing a document, authorities can be easily deprived of or modified via the access control management server. The policy registered in the access control management server is registered by an administrator. Commonly, the user acquires a list of user-settable policies and uses the policies.

The configuration of the access control management server handling PDF documents will be described below. A PDF document can be encrypted, and the user registers file information in the access control management server at the time of encryption. Then, when the user opens the PDF document from a client, the user acquires a decryption key from the access control management server and decrypts the PDF document.

When this method is used, the author of the PDF document can change the file access authority by changing the information on the access control management server even after a file has been distributed.

To view a PDF document, the user commonly opens the file by using a specific application such as Adobe Reader or Acrobat® from Adobe Systems. Although description will be made based on Adobe Reader, an application for viewing the PDF document is not limited thereto but may be Acrobat® or other applications that can handle PDF documents.

For example, when a user views a file encrypted by using the access control management server, Adobe Reader accesses a relevant access control management server. Then, when the user has the file viewing authority for the file, Adobe Reader acquires a decryption key and decrypts the file to open it. Then, the user can view the file.

This configuration also applies to the printing authority and editing authority. Further, operations (viewing, printing, and editing) and users who have performed each operation can be recorded in the access control management server. Hereinafter, a PDF document encrypted by the access control management server is referred to as policy PDF document.

To meet the present demand, it is necessary to handle a PDF document in the off-line environment (for example, when the user cannot access the access control management server because of fire wall or when the user wants to use the PDF document on a location where the user cannot make network connection) while protecting security. In such an off-line environment, since Adobe Reader cannot access the access control management server, the user cannot acquire a result of access authority determination and a decryption key, and therefore cannot basically use the document.

However, to achieve access control following a policy even in the off-line environment, the access control management server may be provided with a function to convert a policy PDF document under management into a PDF document usable in the off-line environment only in a specified effective period. The public format (PDF) is disclosed on the Internet (for example, Portable Document Format Reference Manual Version 1.2).

When making a document with policy usable in the off-line environment, there is a case where a document with policy is converted into a document incorporating a mechanism for opening only in an effective period and password-based limitation is provided to maintain security at a certain level. In the case of a PDF document, for example, it is necessary to give a certain access limitation to the document since only one password can be given to each PDF document because of PDF specifications. For example, one method for giving an access limitation to the PDF document is to give the same limitation as the strictest one among permitted limitations given to the policy PDF document.

Hereinafter, a PDF document given an access limitation in this way is referred to as commonized PDF document. For example, another method for giving an access limitation to the PDF document is to give an access limitation corresponding to the user access authority used in the off-line environment. Hereinafter, a PDF document given an access limitation in this way is referred to as password PDF document.

However, there may be a situation that the user cannot even view a commonized PDF document that is given a strict limitation. With the commonized PDF document, the user cannot give an access limitation according to a policy given to each user. With the password PDF document, since it is necessary to generate a password for each user access authority, the number of PDF documents increases in the off-line environment, making management difficult.

SUMMARY OF THE INVENTION

According to an aspect of the present invention (abstract), to limit access to a document according to a plurality of types of access authorities set to the document when a server apparatus for limiting access to the document having a setting of a plurality of types of access authorities to operate the document cannot limit access to the document according to the access authority, an apparatus includes: a conversion unit configured to convert a document into a plurality of documents having a setting of each of the plurality of types of access authorities; and a generation unit configured to merge the plurality of documents formed through conversion by the conversion unit, so that they can be handled as one document, to generate one merged document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 11A and 11B illustrate an exemplary access authority on virtual policies and real policies.

FIG. 18 illustrates an exemplary history document.

FIG. 20 is a flow chart illustrating processing by the document server.

DESCRIPTION OF THE EMBODIMENTS

Various exemplary embodiments, features, and aspects of the invention will be described in detail below with reference to the drawings.

<Configuration of Document Management System>

Figure 1:
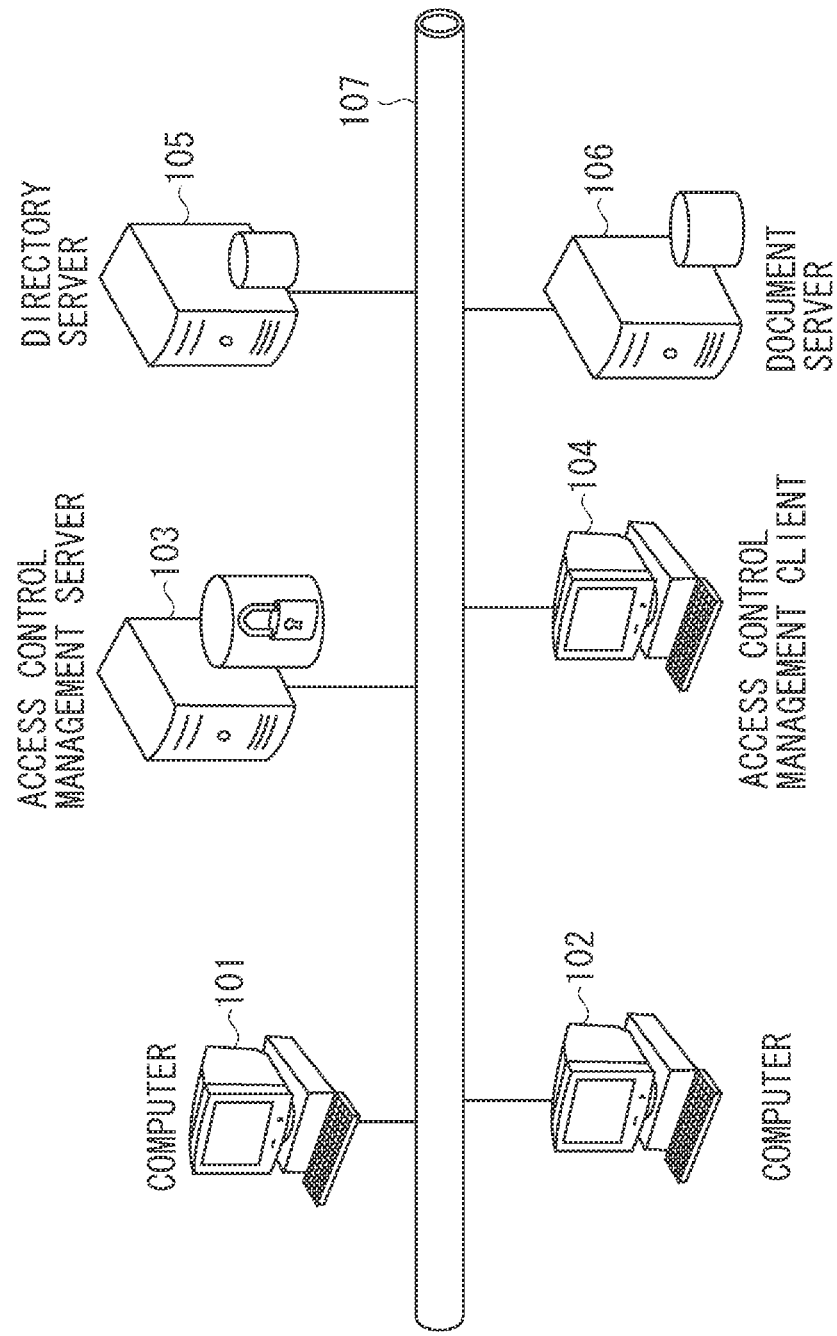
FIG. 1 illustrates an exemplary configuration of a document management system.

FIG. 1 illustrates a configuration of a document management system according to the present exemplary embodiment. The document management system includes computers 101 and 102, an access control management server 103, an access control management client 104, a directory server 105, and a document server 106.

The computers 101 and 102 are information processing apparatuses (computers). The computers 101 and 102 are connected to a network 107 such as a local area network (LAN), a wide area network (WAN), and the Internet via network cables or public lines.

The computers 101 and 102 can execute various types of programs such as application programs. The computers 101 and 102 are provided with a program for reference of a document (file) having an access control information (security policy) setting. Although a plurality of computers are illustrated in FIG. 1, the document management system may include any number of computers.

The access control management server 103 (information processing apparatus) is connected to the network 107. The access control management client 104 (information processing apparatus) sets access control information to a document. The access control management client 104 is provided with a program for reference of a document having an access control information setting.

When generating access control information, the directory server 105 (information processing apparatus) provides directory services (user information retrieval services) for retrieving user information of a user who sets a policy (policy setter).

The directory server 105 is connected to the network 107. Although the directory server 105 is illustrated as a server for providing user information retrieval services, the directory server 105 is not essential for achieving functions of the document management system. In other words, when the directory server 105 is not employed, user information according to the present exemplary embodiment is stored in the access control management server 103, a storage device on the network 107, or a hard disk of any desired device (apparatus).

The document server 106 (information processing apparatus) stores documents and is connected to the network 107. Although the document server 106 is illustrated as a document server for storing documents according to the present exemplary embodiment, the document server 106 is not essential for achieving functions of the document management system. In other words, when the document server 106 is not employed, documents according to the present exemplary embodiment are stored in the computers 101 and 102 owned by the user or a file server, a storage device on the network 107, or a hard disk of any desired device.

<Configuration of Information Processing Apparatus>

The computers 101 and 102, the access control management server 103, the access control management client 104, the directory server 105, and the document server 106 constituting the document management system are ordinary information processing apparatuses.

More specifically, the computers 101 and 102, the access control management server 103, the access control management client 104, the directory server 105, and the document server 106 are information processing apparatuses having a similar or equivalent hardware configuration. The hardware configuration of an information processing apparatus according to the present exemplary embodiment will be described below with reference to FIG. 2.

Figure 2:
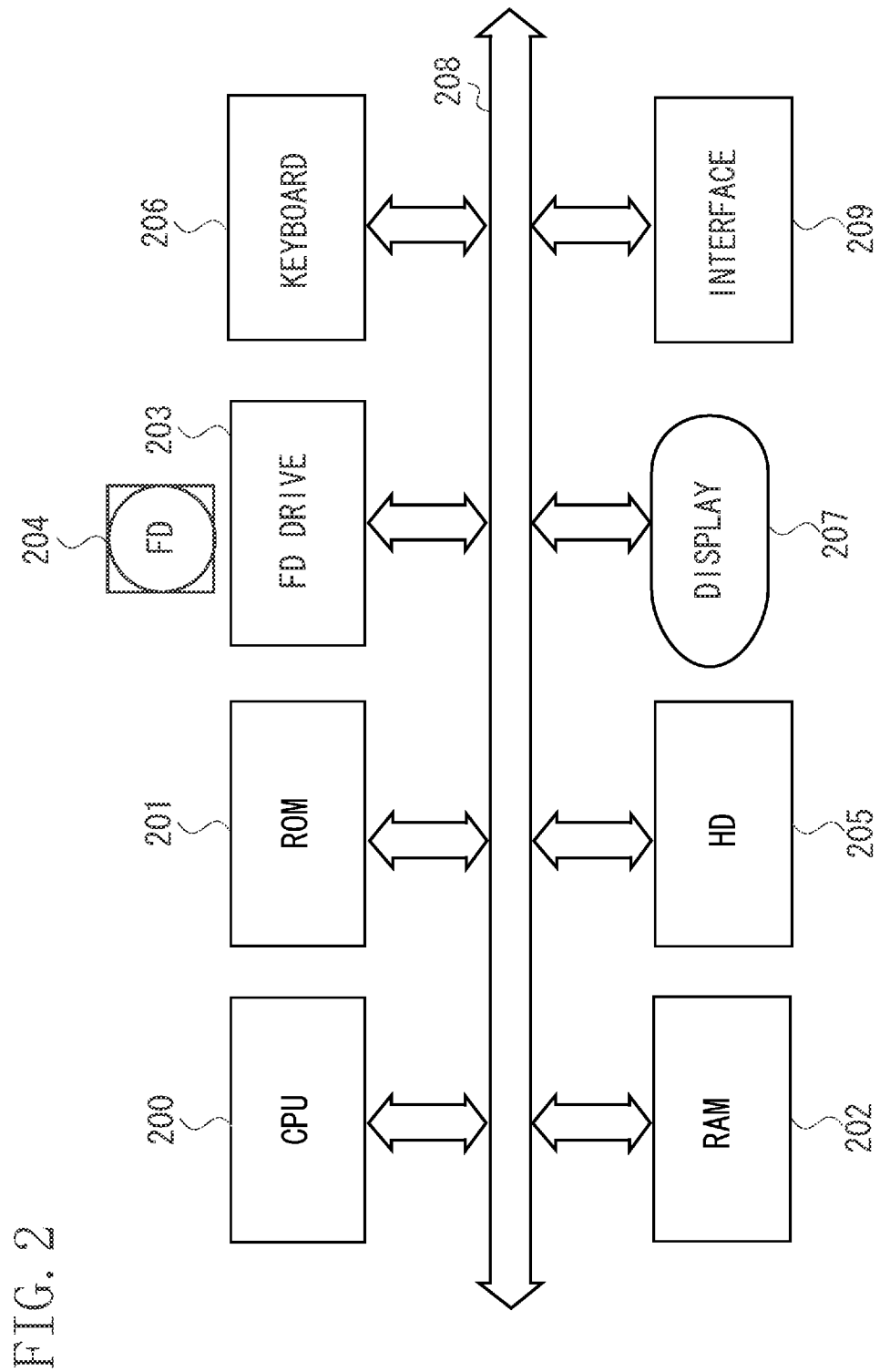
FIG. 2 is a block diagram illustrating a hardware configuration of an information processing apparatus.

FIG. 2 illustrates an exemplary hardware configuration of the information processing apparatus according to the present exemplary embodiment. The information processing apparatus includes a central processing unit (CPU) 200, a read only memory (ROM) 201, a random access memory (RAM) 202, a flexible disk drive (FD) 203, a hard disk (HD) 205, a keyboard 206, a display 207, a system bus 208, and an interface 209.

The CPU 200 is an exemplary control unit for controlling the information processing apparatus. The CPU 200 executes application programs, an operating system (OS), and a document management program stored in the HD 205. The CPU 200 also performs control for temporarily storing in the RAM 202 the information and documents required for program execution.

The ROM 201 is an exemplary storage device for storing programs such as a basic I/O program. The RAM 202 is an exemplary temporary storage device which serves as a main memory and work area for the CPU 200.

The FD drive 203 is an exemplary storage medium reading unit. The FD drive 203 loads a program stored in the FD 204 (storage medium) into the information processing apparatus (for example, the RAM 202) (refer to FIG. 5).

The FD 204 is an exemplary storage medium storing programs that can be read by the information processing apparatus (for example, the CPU 200). The storage medium is not limited to the FD 204 but may be a compact disc read only memory (CD-ROM), a CD recordable (CD-R), a CD rewritable (CD-RW), a personal computer (PC) card, a digital versatile disc (DVD), an integrated circuit (IC) memory card, a magneto-optical disc (MO), a memory stick, and the like.

The HD 205 is an exemplary external storage device which serves as a mass storage to store application programs, the OS, the document management program, and other related programs. The keyboard 206 is an exemplary instruction input unit which enables the user to input various operating instructions to the computer, such as an instruction for policy selection. The display 207 is an exemplary display unit that can display various setting screens and information processed by the CPU 200.

The system bus 208 is a transmission line for managing data flow in the information processing apparatus. The interface 209 is an exemplary input/output unit which enables the information processing apparatus to exchange data with external apparatuses via the interface 209.

Functions and processing (in flow charts described below) of the computers 101 and 102 are achieved when the CPU 200 of the computers 101 and 102 executes procedures of the document management program stored in the FD 204. In the following descriptions, the functions and processing achieved by the CPU 200 of the computers 101 and 102 are executed by the computers 101 and 102.

Functions and processing (in flow charts described below) of the access control management server 103 are achieved when the CPU 200 of the access control management server 103 executes procedures of the document management program stored in the FD 204. In the following descriptions, the functions and processing achieved by the CPU 200 of the access control management server 103 are executed by the access control management server 103.

Functions and processing (in flow charts described below) of the access control management client 104 are achieved when the CPU 200 of the access control management client 104 executes procedures of the document management program stored in the FD 204.

In the following descriptions, the functions and processing achieved by the CPU 200 of the access control management client 104 are executed by the access control management client 104. In other words, functions and processing (in flow charts described below) of the document server 106 are achieved when the CPU 200 of the document server 106 executes procedures of a program stored in the FD 204.

<Memory Map>

Figure 3:
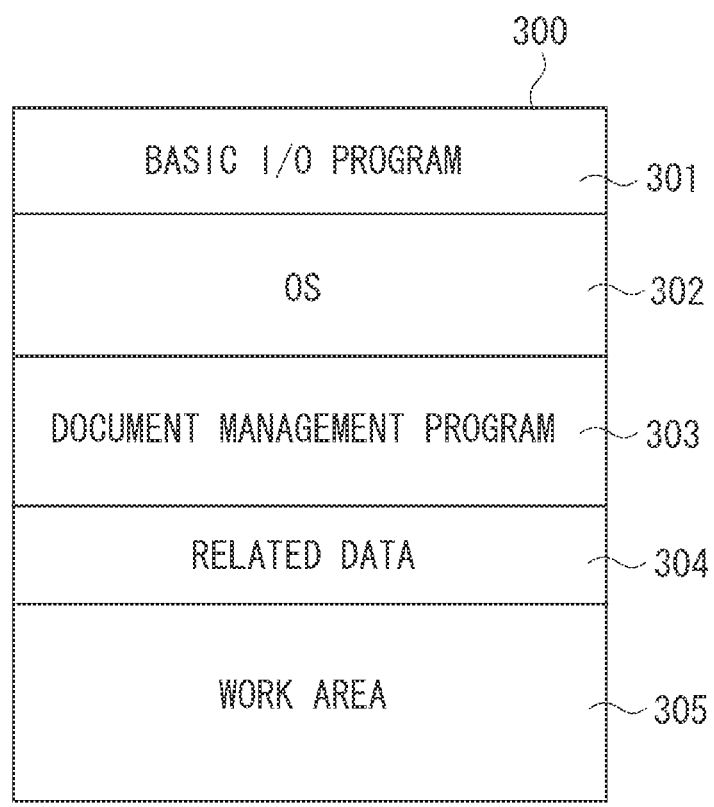
FIG. 3 illustrates an exemplary memory map used in the information processing apparatus.

FIG. 3 illustrates an exemplary memory map 300 in the information processing apparatus. An area 301 is used to hold (store) a basic I/O program. In more detail, the area 301 is used to store a program which executes the initial program loading (IPL) function for activating the OS.

An area 302 is used to store the OS. When the power of the information processing apparatus is turned on, the OS is loaded from the HD 205 into the RAM 202. An area 303 is used to store the document management program according to the present exemplary embodiment. An area 304 is used to store data (related data) relevant to the document management program. An area 305 is a work area used when the CPU 200 executes the document management program.

Figure 4:
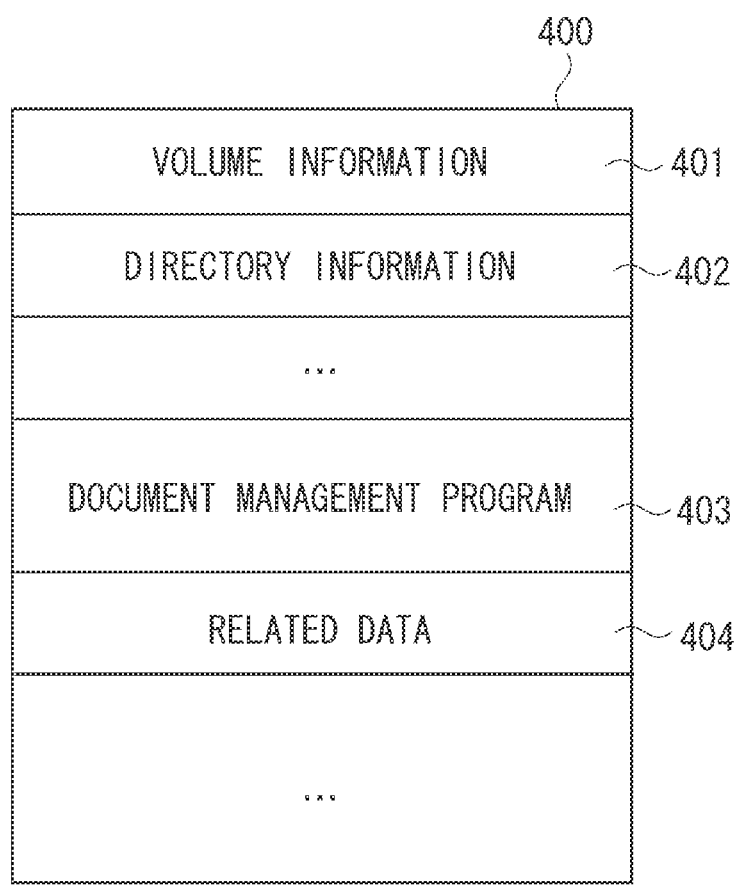
FIG. 4 illustrates an exemplary memory map for a flexible disk (FD).

FIG. 4 illustrates an exemplary memory map 400 in the FD 204. The memory map 400 represents details of the data stored in the FD 204. An area 401 is used to store volume information representing information about data. An area 402 is used to store directory information. An area 403 is used to store the document management program according to the present exemplary embodiment. An area 404 is used to store related data.

Figure 5:
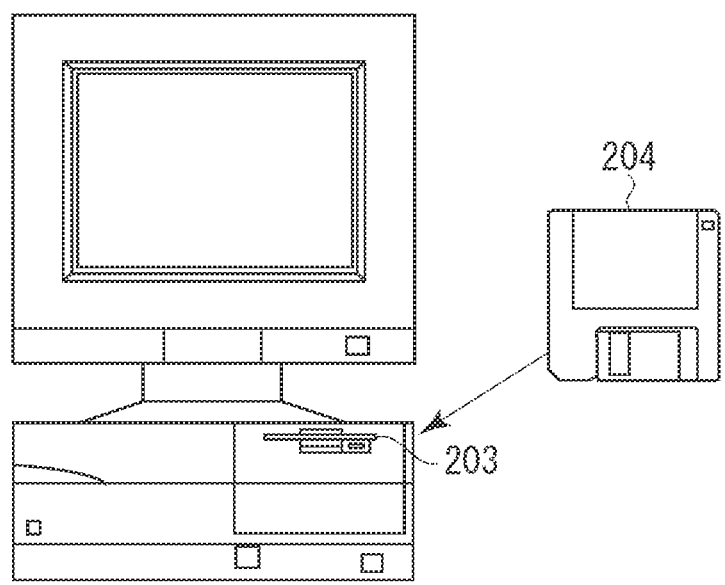
FIG. 5 illustrates a relation between a FD drive and a FD inserted into the FD drive.

FIG. 5 illustrates a relation between the FD drive 203 and the FD 204 inserted into the FD drive 203. The same elements as in FIG. 2 are assigned the same reference numerals. Referring to FIG. 5, the document management program and related data according to the present exemplary embodiment are stored in the FD 204.

<Main processing by Document Management System>

Figure 6:
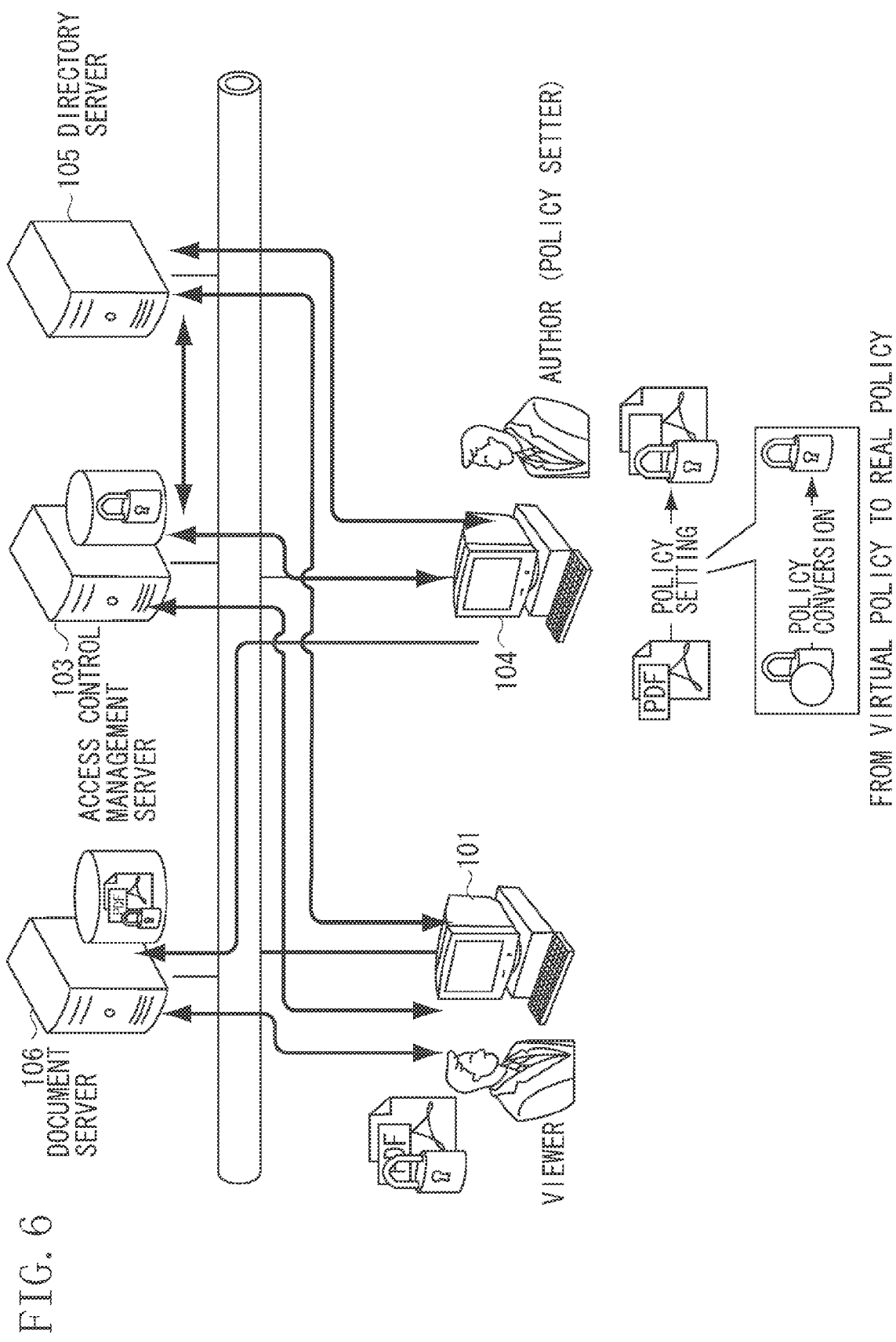
FIG. 6 illustrates data flow of main processing by the document management system.

FIG. 6 schematically illustrates data flows of processing by the document management system according to the present exemplary embodiment. Referring to FIG. 6, access control information is applied to a document with which the user wants to control access. The document is stored in the HD 205 of the document server 106. The same elements as in FIG. 1 are assigned the same reference numerals.

The document management program is operating on the access control management client 104. The user performs various operations such as authentication and virtual policy selection via a user interface (UI) displayed on the display 207 of the access control management client 104. A "virtual policy" refers to a temporary policy prepared commonly for the information processing apparatus.

Based on access authority information (information for limiting access to a document) managed by the document management system (or the document management program), a virtual policy is converted into a real policy that can be commonly interpreted by the document management system (or the document management program).

A "real policy" refers to a policy that can be commonly interpreted by the document management system (or the document management program) according to the present exemplary embodiment. In addition to information for limiting editing and viewing, the access authority information includes information about an accessible range according to the authentication information of a policy setter who set a virtual policy (information about groups, sections, departments, companies, etc. permitted or limited to access).

The access control management client 104 also sets a user-selected virtual policy to data (document) selected by the user. The access control management client 104 transmits a policy conversion request (policy setting request) including a virtual policy to the access control management server 103.

Upon reception of the policy conversion request from the access control management client 104, the access control management server 103 converts the virtual policy into a real policy and then returns the real policy to the access control management client 104.

The directory server 105 storing user information can timely return various pieces of information in response to inquiries on user information and group information from the access control management server 103.

The access control management client 104 sets the returned real policy to a document and then stores it in the HD 205 of the document server 106. Data having a real policy given thereto is referred to as data with policy (or a document with policy).

When a viewer (or editor) requests to view a document with policy stored in the document server 106 via the computer 101, the computer 101 basically inquires the access control management server 103 at the time of viewing (or editing). In response to the inquiry, the access control management server 103 performs access authentication regarding viewing of the relevant document with policy stored in the document server 106.

Although the document with policy is stored in the HD 205 of the document server 106 in the above example, the destination location of a document with policy is not limited thereto but may be a shared folder on the network 107, a file server, or any other storage devices.

<Processing by Access Control Management Client 104 in Access Control Information Setting>

Figure 7:
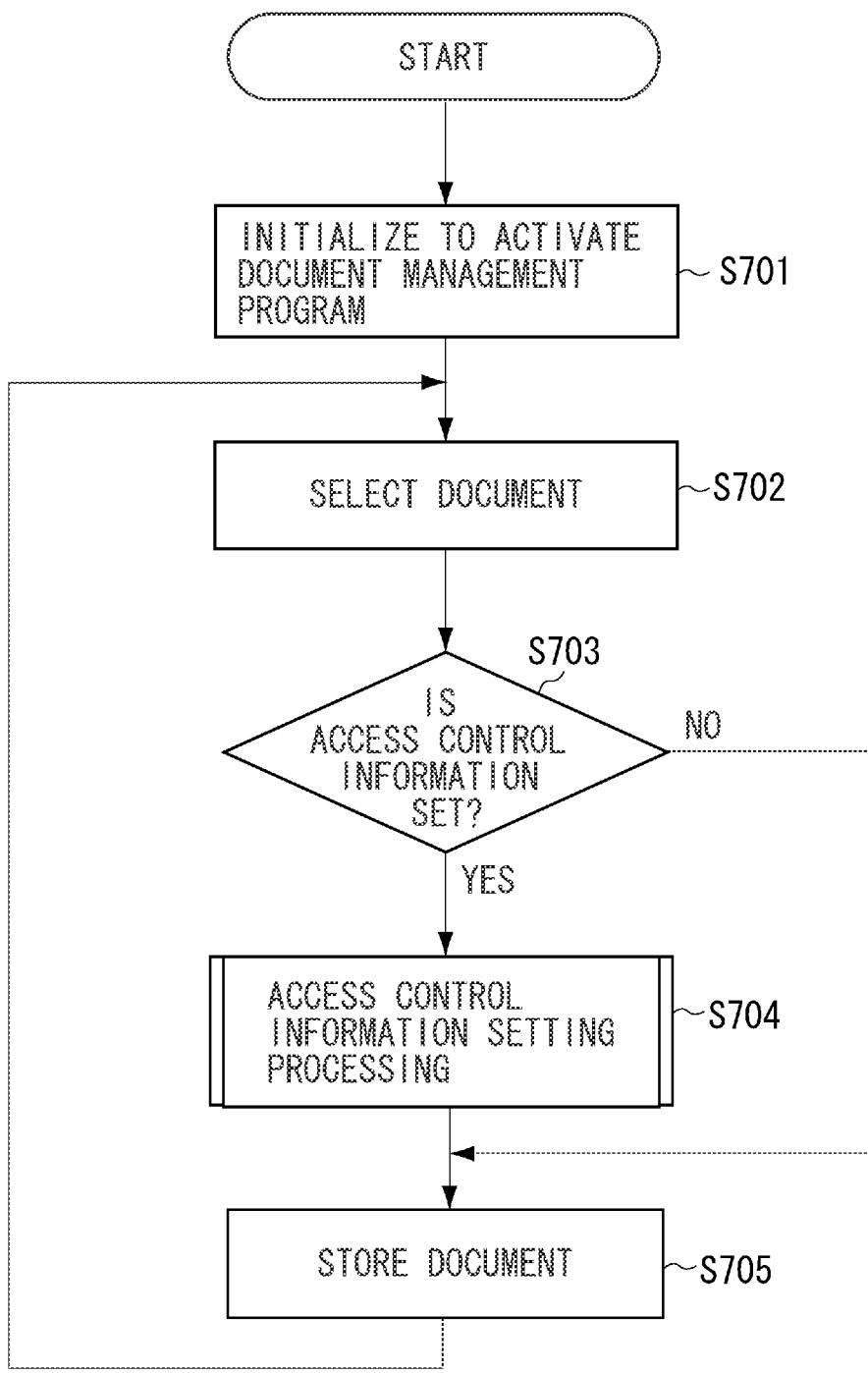
FIG. 7 is a flow chart illustrating processing by an access control management client.

FIG. 7 is a flow chart illustrating an exemplary access control information setting in the access control management client 104. This processing is performed under overall control of the CPU 200 of the access control management client 104. The processing will be described below with reference to the flow chart in FIG. 7.

In step S701, the access control management client 104 performs necessary initialization processing to activate the document management program. In step S702, the access control management client 104 receives data (document) selected by the policy setter to store it in the document server 106.

In step S703, the access control management client 104 displays a UI enabling the user to determine whether the access control information is to be set in the access control management client 104. When the user determines that the access control information is to be set in the access control management client 104 (YES in step S703), the processing proceeds to step S704. In step S704, the access control management client 104 performs the access control information setting.

On the other hand, when the user determines that the access control information is not to be set in the access control management client 104 (NO in step S703), the processing proceeds to step S705. The access control information setting will be described in detail below with reference to the flow chart in FIG. 8.

In step S705, the access control management client 104 performs processing for storing the document at a specified location in the HD 205 of the document server 106. The location for storing documents is not limited to the document server 106 but may be a hard disk of a different apparatus or a file server accessible by the access control management client 104.

<Access Control Information Setting Processing>

Figure 8:
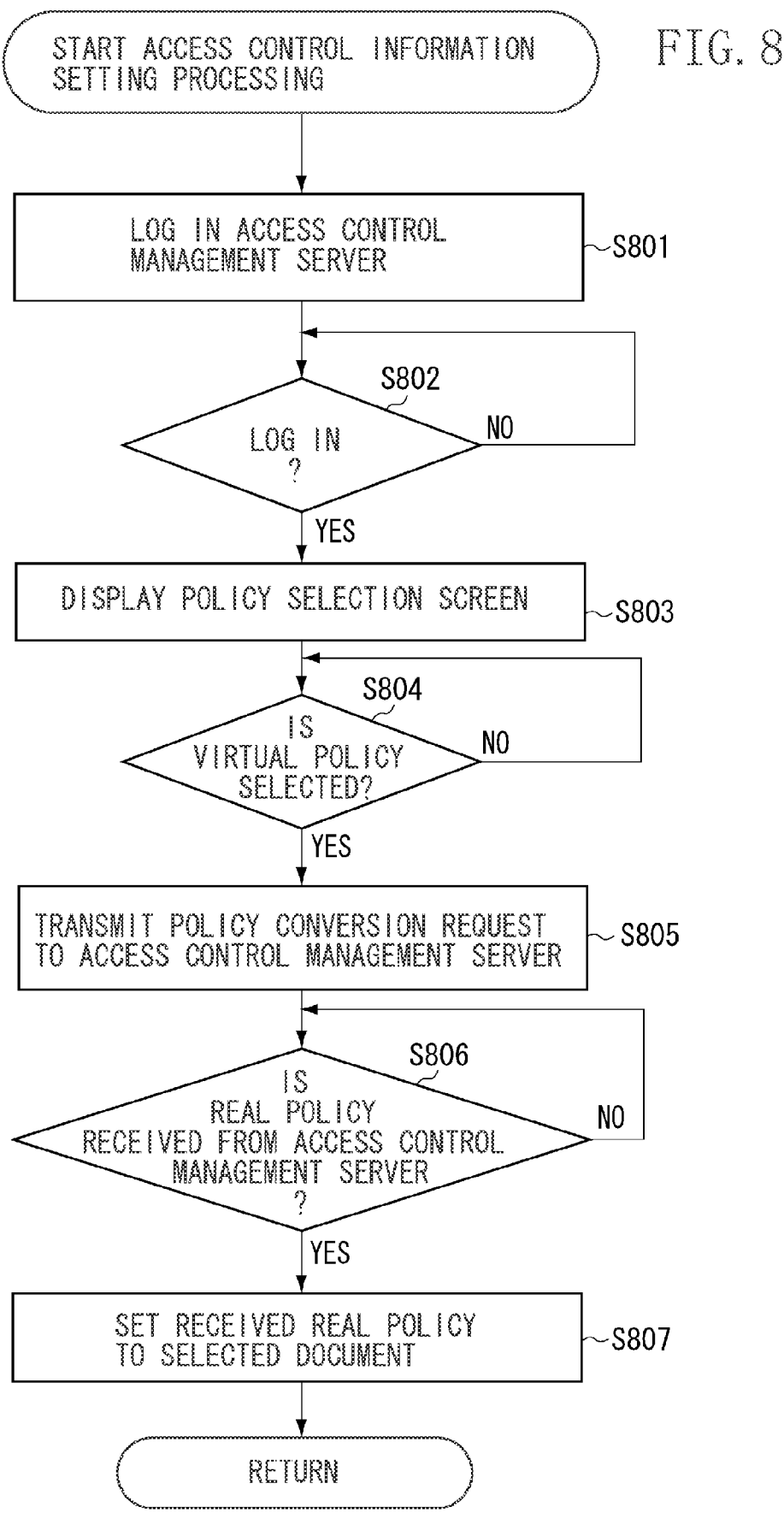
FIG. 8 is a flow chart illustrating access control information setting.

Access control information setting processing will be described below with reference to FIG. 8. FIG. 8 is a flow chart illustrating an exemplary access control information setting. This processing is performed under overall control of the CPU 200 (including the CPU 200 of the access control management server 103 in a broad sense) of the access control management client 104.

In step S801, the access control management client 104 logs in the access control management server 103. In step S802, the access control management client 104 determines whether it is logged in by the user.

When the access control management client 104 determines that it is logged in by the user (YES in step S802), the processing proceeds to step S803. In step S803, the access control management client 104 displays on the display 207 a policy selection screen displaying a list of virtual policies (refer to FIG. 9.). The list of virtual policies displayed in step S803 is a list of preregistered virtual policies.

On the other hand, when the access control management client 104 does not determine that it is logged in by the user (NO in step S802), the access control management client 104 waits for login. When the access control management client 104 fails to log in, it may display a login error on the display 207 and then terminate the processing.

Figure 9:
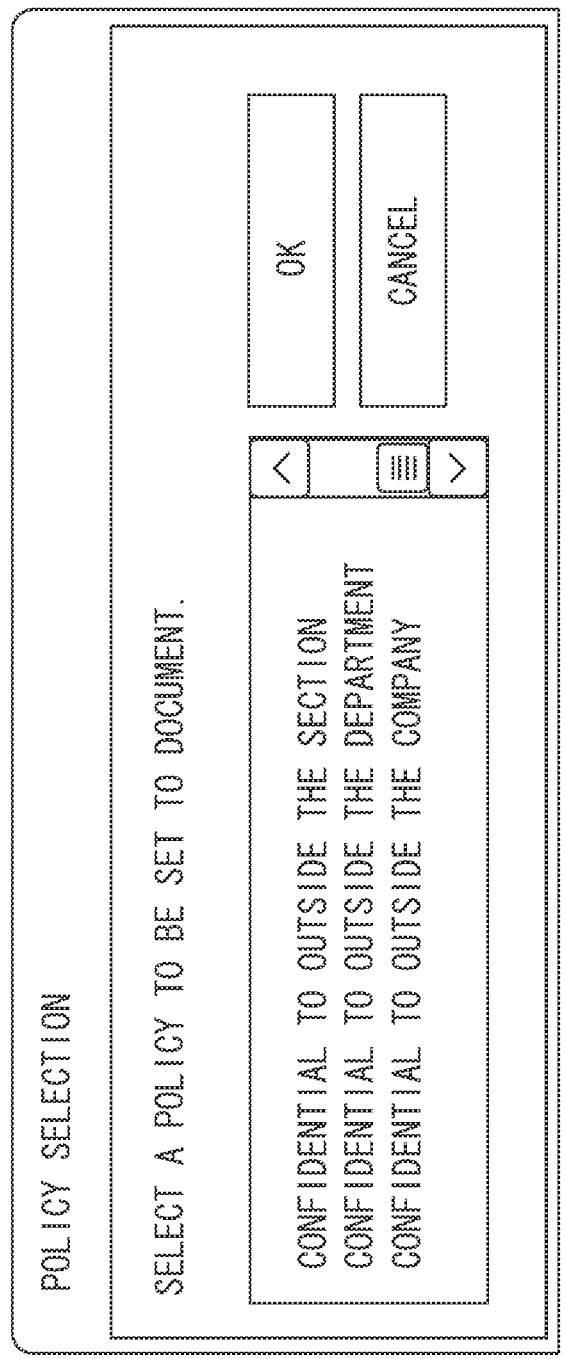
FIG. 9 illustrates an exemplary virtual policy selection screen displaying a list of virtual policies.

FIG. 9 illustrates an exemplary policy selection screen displaying a list of virtual policies. In this example, virtual policies such as "Confidential to outside the section", "Confidential to outside the department", and "Confidential to outside the company" are displayed. The policy setter selects any one virtual policy from the list of virtual policies and then press the OK button to select the virtual policy.

Subsequently, in step S804, the access control management client 104 determines whether a virtual policy is selected in the virtual policy selection screen. When a virtual policy is not selected (NO in step S804), the access control management client 104 waits until a virtual policy is selected.

On the other hand, when the access control management client 104 determines that a virtual policy is selected (YES in step S804), the processing proceeds to step S805. In step S805, the access control management client 104 transmits a policy conversion request to the access control management server 103.

When selecting a virtual policy, the access control management client 104 can read setting information accompanying the virtual policy (policy setter information including virtual user information and accessible virtual group information) from the HD 205.

When the selected virtual policy is accompanied by policy setter information, the access control management client 104 transmits the policy setter information to the access control management server 103 together with the selected virtual policy. For example, when the selected virtual policy is accompanied by policy setter information, the access control management client 104 transmits the virtual user information to the access control management server 103 together with the virtual policy.

Upon reception of the policy conversion request, the access control management server 103 converts the virtual policy into a real policy that can be interpreted by the access control management server 103. The processing for converting a virtual policy into a real policy by the access control management server 103 will be described in detail below with reference to the flow chart in FIG. 10.

In step S806, the access control management client 104 determines whether a real policy is received from the access control management server 103. When the access control management client 104 determines that a real policy is not received (NO in step S806), the access control management client 104 waits until a real policy is received.

On the other hand, when the access control management client 104 determines that a real policy is received (YES in step S806), the processing proceeds to step S807. In step S807, the access control management client 104 sets the received real policy (access control information) to the document selected in step S702.

Then, the access control management client 104 stores the document having a real policy setting in the storage device (the document server 106 in this example) specified in step S705. Access authorities for the stored document are managed by the access control management server 103.

<Processing by Access Control Management Server 103>

Figure 10B:
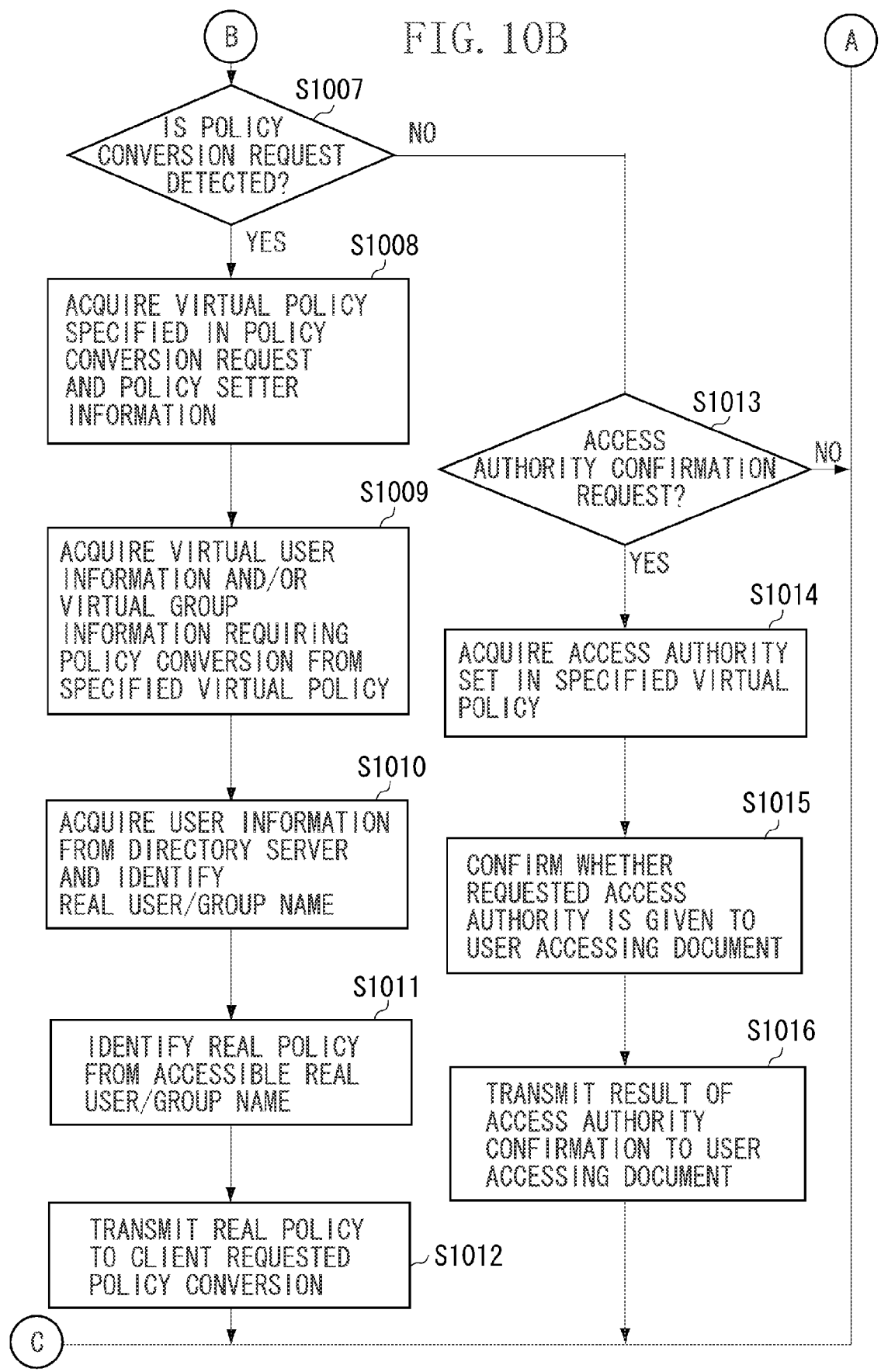
FIG. 10 (10A and 10B) is a flow chart illustrating processing by the access control management server.

Processing by the access control management server 103 will be described below with reference to FIG. 10. FIG. 10 is a flow chart illustrating exemplary processing of the access control management server 103. This processing is performed under overall control of the CPU 200 of the access control management server 103.

In step S1001, the access control management server 103 performs necessary initialization processing to activate the document management program. In step S1002, the access control management server 103 determines whether a login request is detected. When the access control management server 103 determines that the login request is detected (YES in step S1002), the processing proceeds to step S1003.

In step S1003, the access control management server 103 inquires of the directory server 105 for the access authority of a user (policy setter). Although the directory server 105 providing general information retrieval services has information about access authorities of the user, an authentication server enabling user authentication or other method can also be used.

In step S1004, the access control management server 103 confirms a result of the authentication. When the authentication is OK (YES in step S1004), the processing proceeds to step S1006. In S1006, the access control management server 103 performs processing (login processing) necessary for login. Upon completion of processing of step S1006 by the access control management server 103, the processing returns to step S1002.

On the other hand, when the authentication is NG (NO in step S1004), the processing proceeds to step S1005. In step S1005, the access control management server 103 returns an authentication error to the client requested login (for example, the client requested policy conversion), and the processing returns to step S1002.

When the access control management server 103 determines that the login request is not detected (NO in step S1002), the processing proceeds to step S1007.

In step S1007, the access control management server 103 determines whether a policy conversion request is detected. When the access control management server 103 determines that the policy conversion request is detected (YES in step S1007), the processing proceeds to step S1008.

In step S1008, the access control management server 103 acquires the virtual policy specified in the policy conversion request and the information (policy setter information) about the policy setter who selected (set) the virtual policy.

The access control management server 103 has in its HD 205 a list of access authorities set for each virtual policy, for example, in a database (refer to FIG. 11A). This list serves as access authority information that defines authorities to access a document. The access authority information includes information that defines types of access to the document and information about user groups limited to access the document.

FIG. 11A illustrates access authorities (viewing, editing, and printing authorities) set for virtual policy "Confidential to outside the department." FIG. 11A illustrates that the policy setter is given all access authorities (marked "o") and that members of the department to which the policy setter belongs (hereinafter referred to as policy setter's department) are given access authorities other than the editing authority. FIG. 11A illustrates that other users are given no access authority.

In this case, information requiring policy conversion (information registered in the list as variable information) includes "Policy setter" and "Member of policy setter's department." FIG. 11B illustrates access authorities set for real policy "Confidential to outside the sales department" (described below).

In step S1009, the access control management server 103 reads information about a specified virtual policy from the access authority information to acquire virtual user information and, as required, virtual group information requiring policy conversion. Referring to FIG. 11A, for example, the information about "Policy setter" may correspond to the virtual user information, and the information about "Member of policy setter's department" may correspond to the virtual group information.

In step S1010, the access control management server 103 acquires user information corresponding to the virtual user information from the directory server 105, and identifies names of real users (real user names). In this case, the access control management server 103 also identifies names of real groups (real group names).

Figure 12:
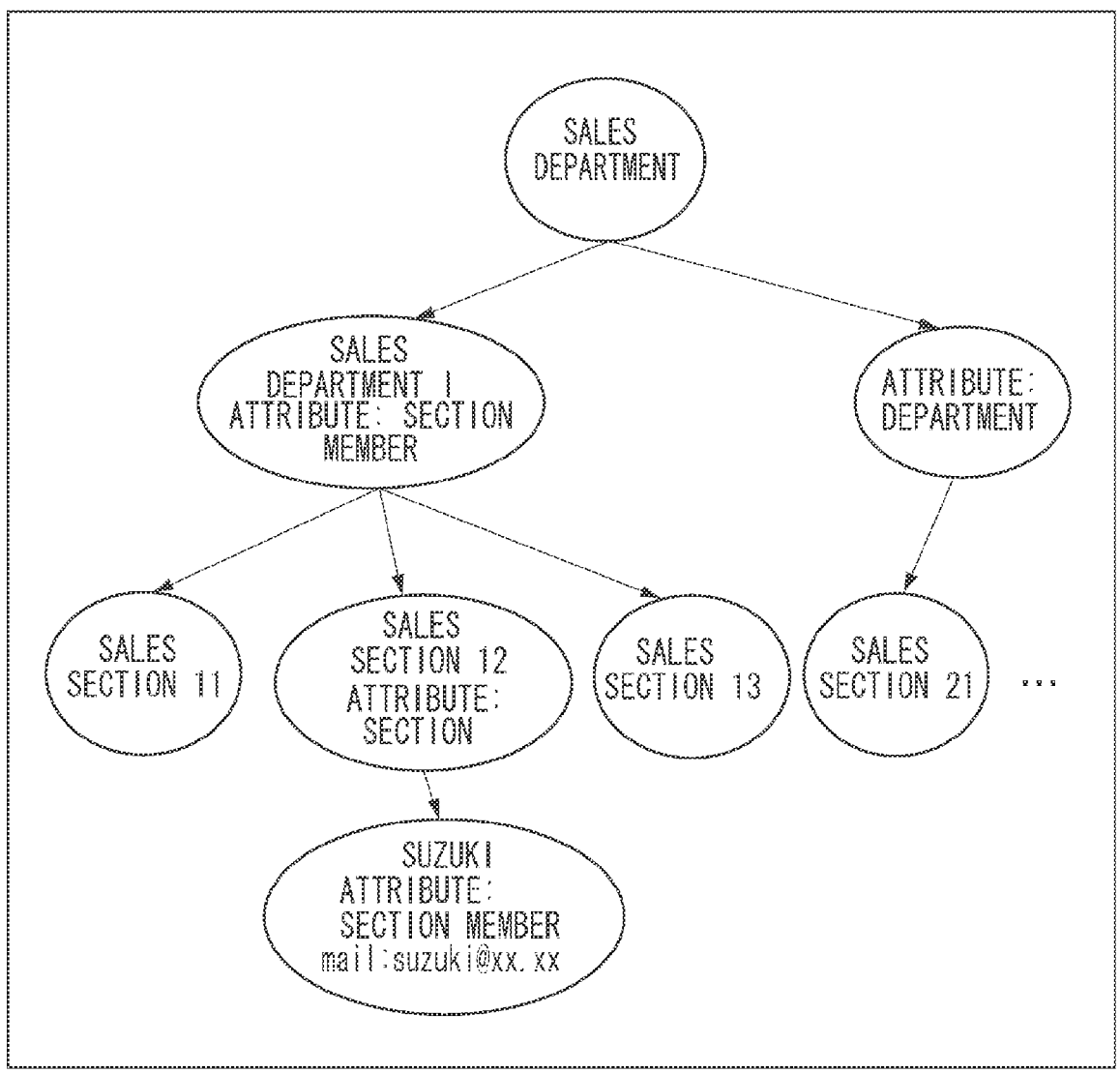
FIG. 12 illustrates exemplary user information and group information.

In more detail, as illustrated in FIG. 12, tree-structured information about a real user name and real group names is stored in the directory server 105. Tracing links in the tree structure enables acquiring, for example, information about a section member, sections, departments, and higher level attributes.

For example, a case where "SUZUKI" requests policy conversion will be described below with reference to FIG. 12. In this case, it is identified that "SUZUKI" belongs to "Sales department I." Therefore, when "SUZUKI", a member of sales section I, selects virtual policy "Confidential to outside the department", "Policy setter" is converted into "SUZUKI", and "Member of policy setter's department" is converted into "Member of sales department I" (FIG. 11B).

In step S1011, the access control management server 103 identifies a real policy by using an accessible real user name (also by using a real group name when a real group name is identified).

In step S1012, the access control management server 103 transmits the real policy identified in step S1011 to the client requested policy conversion, and the processing returns to step S1002.

When the access control management server 103 determines that the policy conversion request is not detected (NO in step S1007), the processing proceeds to step S1013. In subsequent processing, the access control management server 103 determines the presence of the access authority for a document having a real policy setting, based on the authentication information of the user accessing the document.

In step S1013, the access control management server 103 determines whether an access authority confirmation request for the specified virtual policy is received. When the access control management server 103 determines that the access authority confirmation request is received (YES in step S1013), the processing proceeds to step S1014. On the other hand, when the access control management server 103 determines that the access authority confirmation request is not received (NO in step S1013), the processing returns to step S1002. Then, the access control management server 103 repetitively performs similar processing.

In step S1014, the access control management server 103 acquires access authorities for the user or group set in the specified virtual policy with reference to a list of access authorities stored in the database.

In step S1015, the access control management server 103 confirms whether the requested access authority is given to the user accessing the document. In step S1016, the access control management server 103 transmits a result of the access authority confirmation to the user accessing the document, and the processing returns to step S1002.

<Processing by Computers 101 and 102 to Issue Access Authority Confirmation Request for Document having Access Control Information Setting>

Processing performed by computers (for example, the computers 101 and 102) to issue an access authority confirmation request for a document having an access control information setting will be described below with reference to the flow chart in FIG. 13. This processing is performed under overall control of the CPU 200 in the computers 101 and 102 (hereinafter referred to as user terminals).

In step S1101, a user terminal performs necessary initialization processing to activate the document management program.

In step S1102, the user terminal determines whether a document open request (OPEN request) by the user is detected. When the document open request is detected (YES in step S1102), the processing proceeds to step S1103. In step S1103, the user terminal acquires a specified document. On the other hand, when the document open request is not detected (NO in step S1102), the user terminal waits for reception of a document open request.

Documents may be stored in any locations accessible by the user terminal, such as a HD of any desired information processing apparatus, a file server, and a document server.

In step S1104, the user terminal determines whether the access control information (real policy) managed by the access control management server 103 is set to a document. When the user terminal determines that the access control information is set to the document (YES in step S1104), the processing proceeds to step S1105. On the other hand, when the user terminal determines that the access control information is not set to the document (NO in step S1104), the processing returns to step S1102.

In step S1105, the user terminal issues a login request to the access control management server 103.

In step S1106, the user terminal issues an access authority confirmation request to the access control management server 103, and then acquires a result of the access authority confirmation. In this case, the access control management server 103 confirms whether the login user (the user who requested to access the document) has any authority (access authority) to access the document having an access control information (real policy) setting. The access authorities include, for example, the viewing, editing, and printing authorities for a document having an access control information setting.

In response to the access authority confirmation request, the access control management server 103 performs processing of steps S1014, S1015, and S1016 illustrated in FIG. 10. The processing of step S1016 enables the user terminal to acquire a result of the access authority confirmation.

In step S1107, the user terminal determines whether the login user can access the document based on the result of the access authority confirmation in step S1106. In other words, the user terminal limits access to the document having a real policy setting based on the result of the access authority confirmation in step S1106.

In the present exemplary embodiment, the user terminal opens a document with any one of the edit/printing/viewing authority, the edit/viewing authority, the printing/viewing authority, and the viewing authority (steps S1108 to S1111) according to the type of access, and the processing returns to step S1102. When the user terminal determines that the login user does not have, for example, the viewing authority for the document, the processing proceeds to step S1112. In step S1112, the user terminal notifies an error, and the processing returns to step S1102.

<Processing by Access Control Management Client 104 in Off-Line Take-Out Registration>

Figure 14:
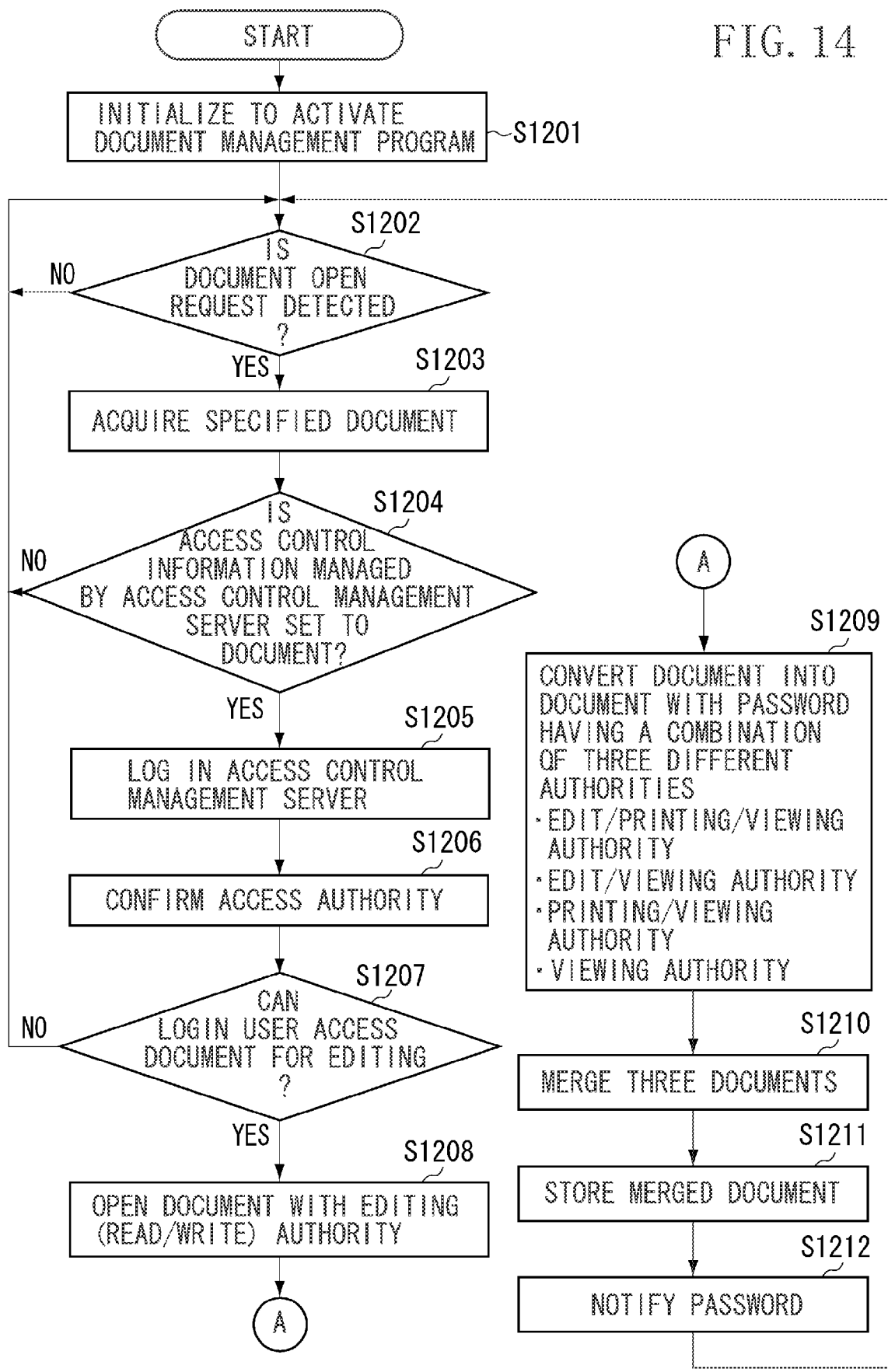
FIG. 14 is a flow chart illustrating processing by the access control management client.

Processing for accessing a document having an access control information setting without intervention of the access control management server 103 (that is, processing for limiting information) will be described below with reference to FIG. 14.

This processing is performed to enable accessing the above-mentioned document even in the off-line environment (in other words, in a state where the access control management server 103 for limiting access to a document according to a plurality of types of access authorities cannot limit access to the document according to an access authority). This processing is performed under overall control of the CPU 200 of the access control management client 104.

Figure 13A:
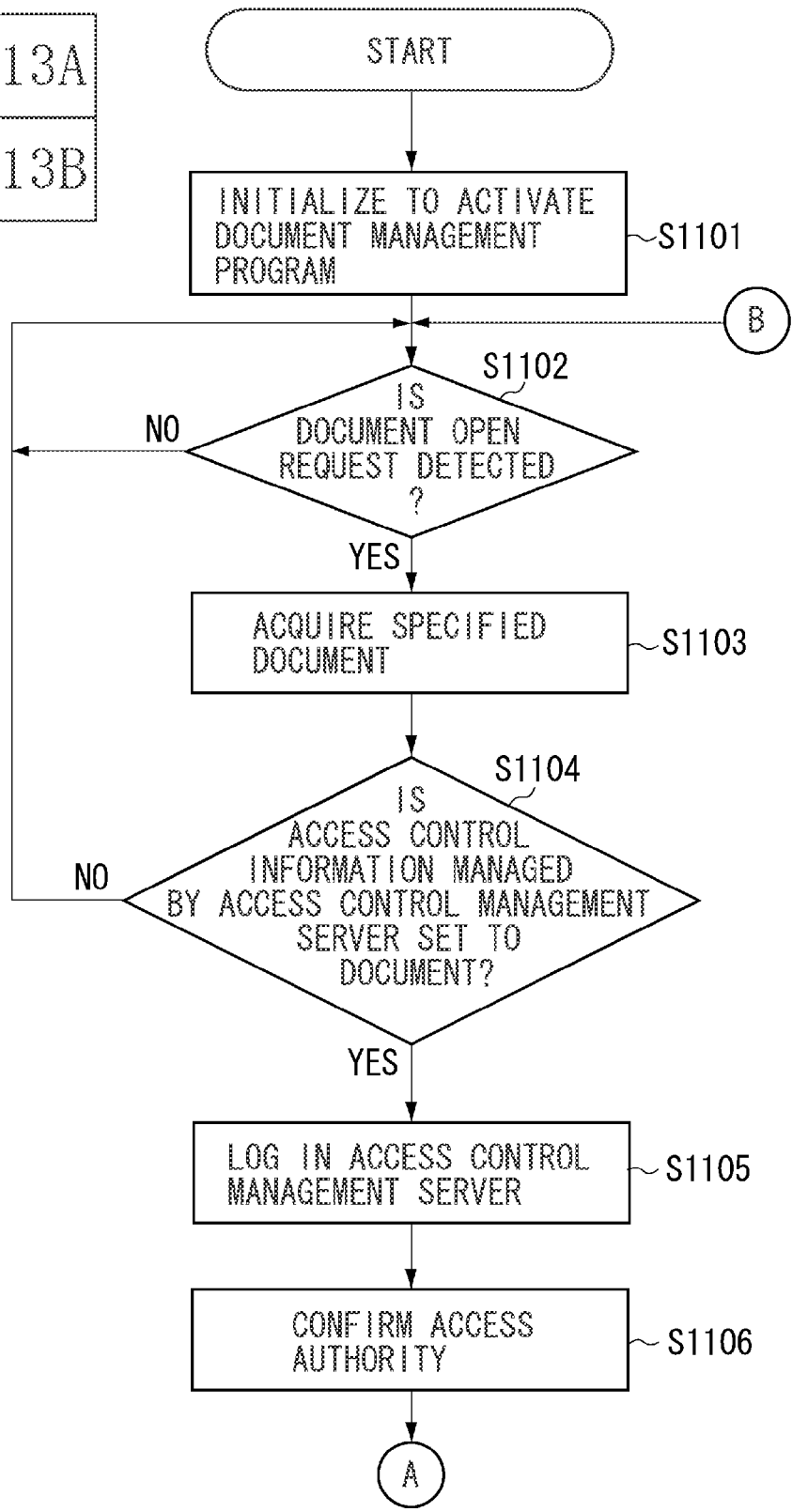
FIG. 13 (13A and 13B) is a flow chart illustrating processing by a user terminal.
Figure 13B:
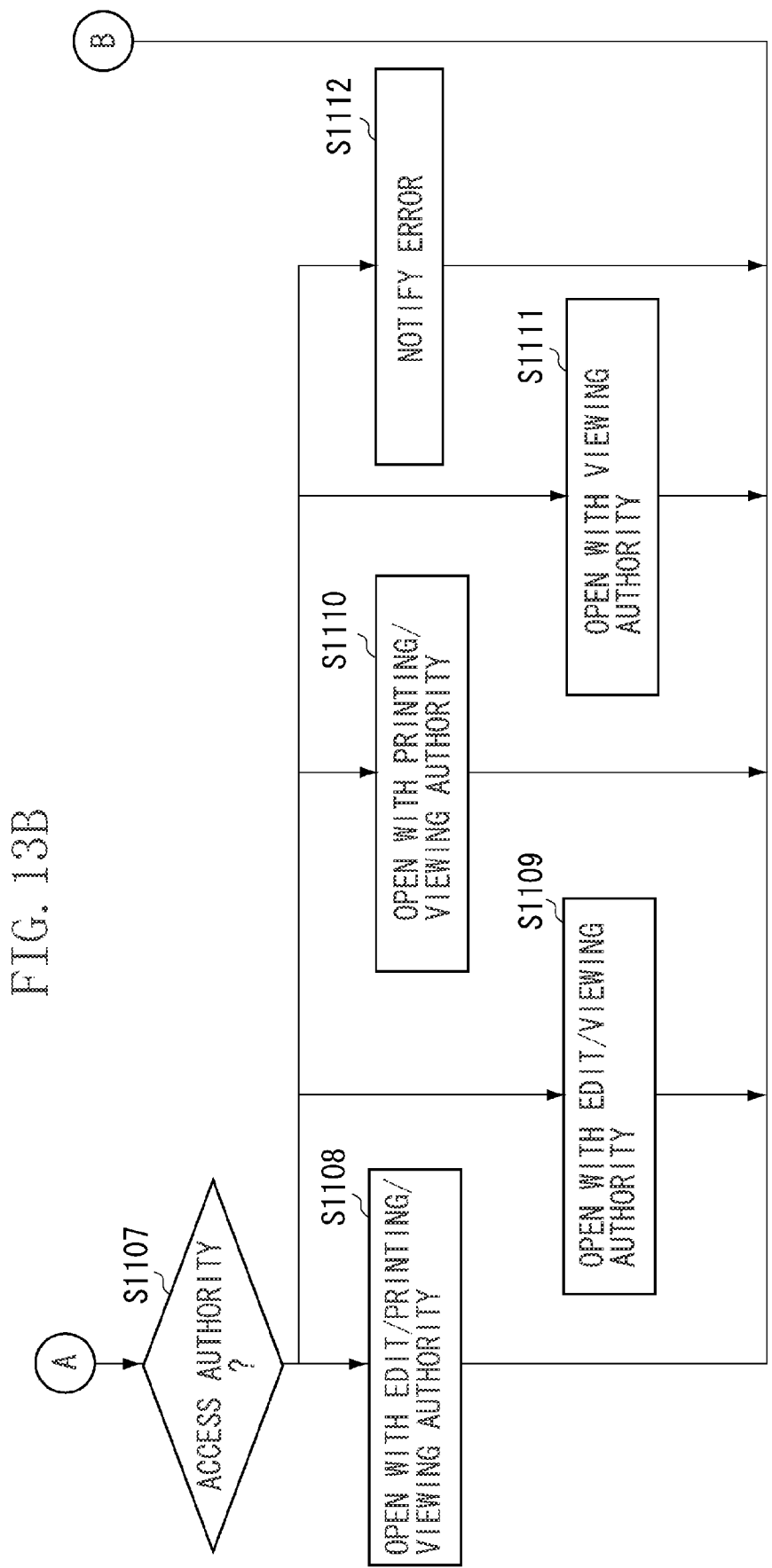

Since processing from step S1201 to step S1206 is similar to the processing from step S1101 to step S1106 illustrated in FIG. 13, descriptions will be omitted.

In step S1207, the access control management client 104 determines whether the login user can access the document for editing, based on a result of the access authority confirmation in step S1206. More specifically, the access control management client 104 limits operation for (access to) the document having a real policy setting, based on the result of the access authority confirmation in step S1206.

When the login user can access the document for editing (YES in step S1207), the processing proceeds to step S1208. In step S1208, the access control management client 104 opens the document with the editing authority, and the processing proceeds to step S1209. On the other hand, when the login user cannot access the document for editing (NO in step S1207), the processing returns to step S1202.

In step S1209, the access control management client 104 converts the document into a document with password. A document with password refers to an encrypted document that can be decrypted by using an opening password as a decryption key.

The access control management client 104 generates a document that can only be viewed, printed, or edited as a document with password. For example, after entering a relevant password, a document with password permitting only the viewing authority is opened so that it can only be viewed. This document with password is a common file and can be implemented by using a function to encrypt the document file format PDF defined by Adobe.

Figure 15:
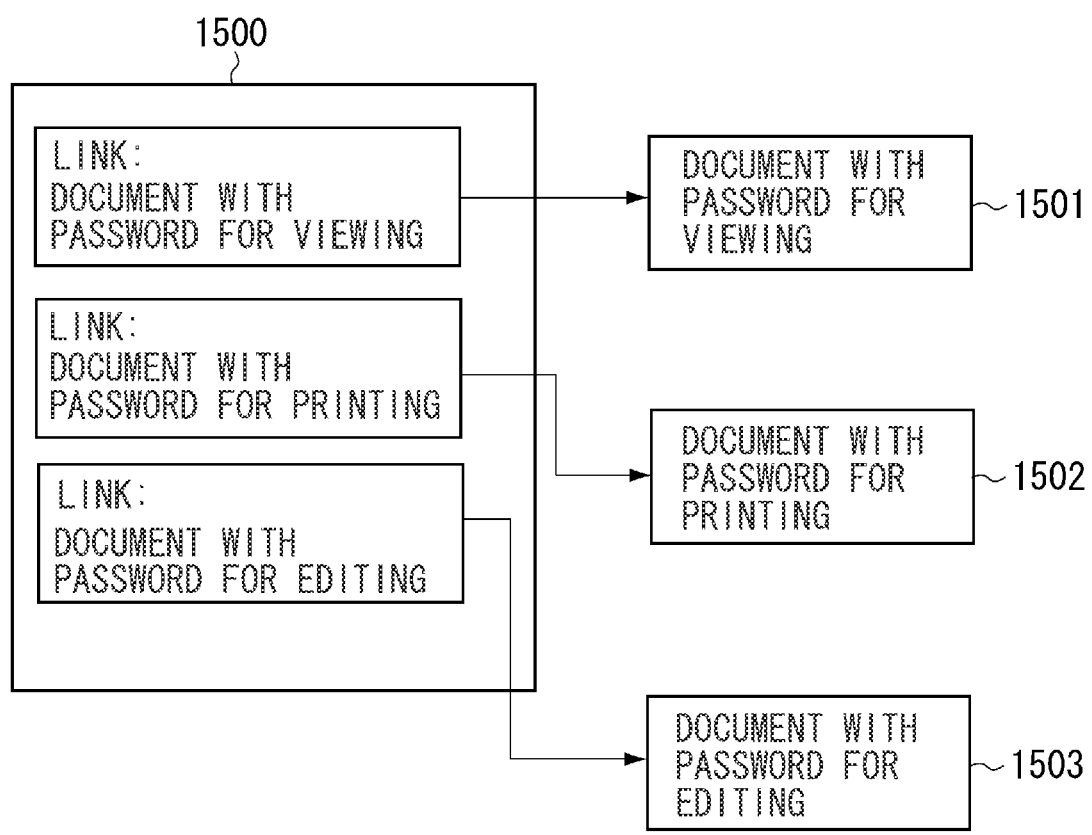
FIG. 15 illustrates an exemplary merged document.

In step S1210, the access control management client 104 merges (combines) three documents with password generated in step S1209. A concept of a merged document is illustrated in FIG. 15 (hereinafter, a document formed by merging a plurality of documents are referred to as merged document).

A merged document 1500 includes information about links to sub-documents 1501 to 1503. The sub-documents 1501 to 1503 are the above-mentioned documents with password. Referring to FIG. 15, the documents with password include the sub-document 1501 with password for viewing, the sub-document 1502 with password for printing, and the sub-document 1503 with password for editing. The merged document 1500 can be implemented, for example, by using a PDF package of the document file format PDF defined by Adobe.

In step S1211, the access control management client 104 stores the merged document 1500 in the HD 205 of the document server 106 under a document name specified by the user.

In step S1212, the access control management client 104 notifies by mail each user of a path of the merged document 1500 and passwords (passwords for a document for viewing, a document for printing, and a document for editing) according to the access authority of the user based on a real policy.

For example, user "SUZUKI" illustrated in FIG. 11B is permitted to view, edit, and print the document. Therefore, the access control management client 104 notifies by mail each of passwords for the document with password for viewing, the document with password for printing, and the document with password for editing to the mail address registered in the user information illustrated in FIG. 12.

Likewise, the access control management client 104 notifies by mail each of passwords for the document with password for viewing and the document with password for printing to "Member of sales department I" illustrated in FIG. 11B.

<Processing by Document Server 106 in Off-Line Take-Out>

Figure 16:
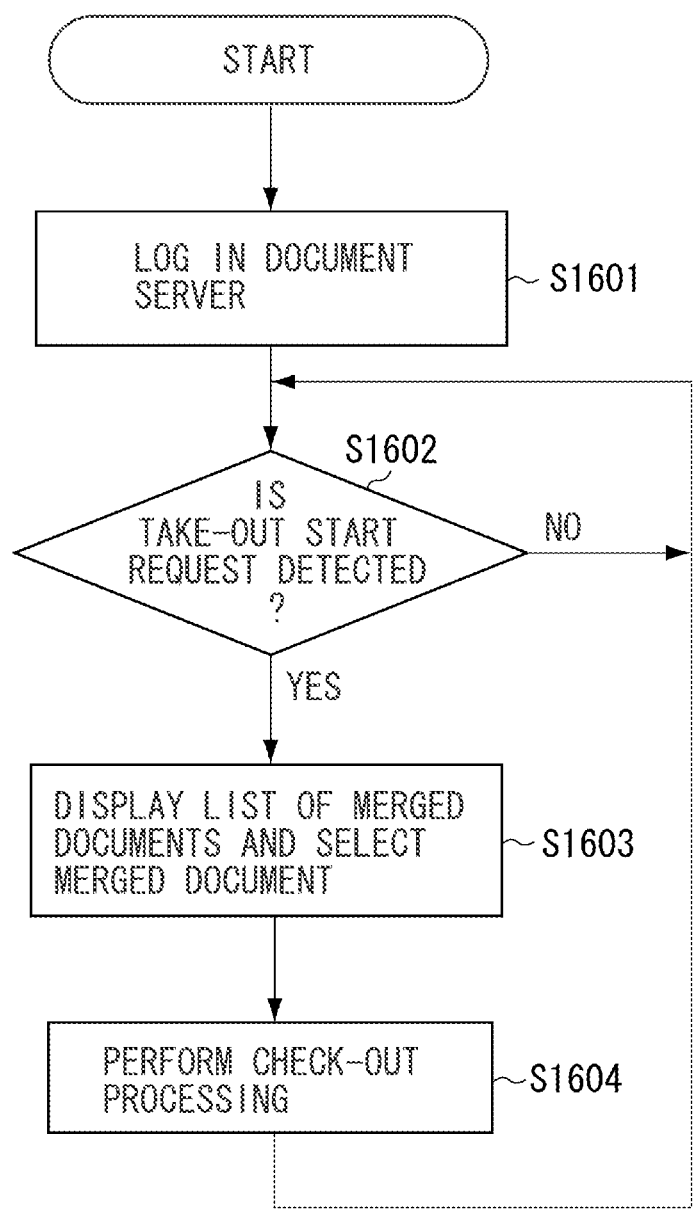
FIG. 16 is a flow chart illustrating processing by a document server.

Processing for taking out a document (the merged document 1500 registered for off-line take-out) that is made accessible even in the off-line environment will be described below with reference to FIG. 16. This processing is performed under overall control of the CPU 200 of the document server 106.

In step S1601, when the document server 106 is accessed by a user operation, the document server 106 issues a login request to the access control management server 103.

In step S1602, the document server 106 determines whether a take-out start request by the user is detected. When the take-out start request is detected (YES in step S1602), the processing proceeds to step S1603. In step S1603, the document server 106 acquires and displays a list of merged documents 1500 and receives a merged document 1500 selected from the list by the user.

In step S1604, the document server 106 performs check-out processing of the merged document 1500 selected in step S1603. The check-out processing refers to processing for representing a state where a user has taken out the merged document 1500 and preventing other users from operating the merged document 1500 until the user who has taken it out checks in.

<Processing by Computers 101 and 102 in Off-Line Take-Out>

Figure 17:
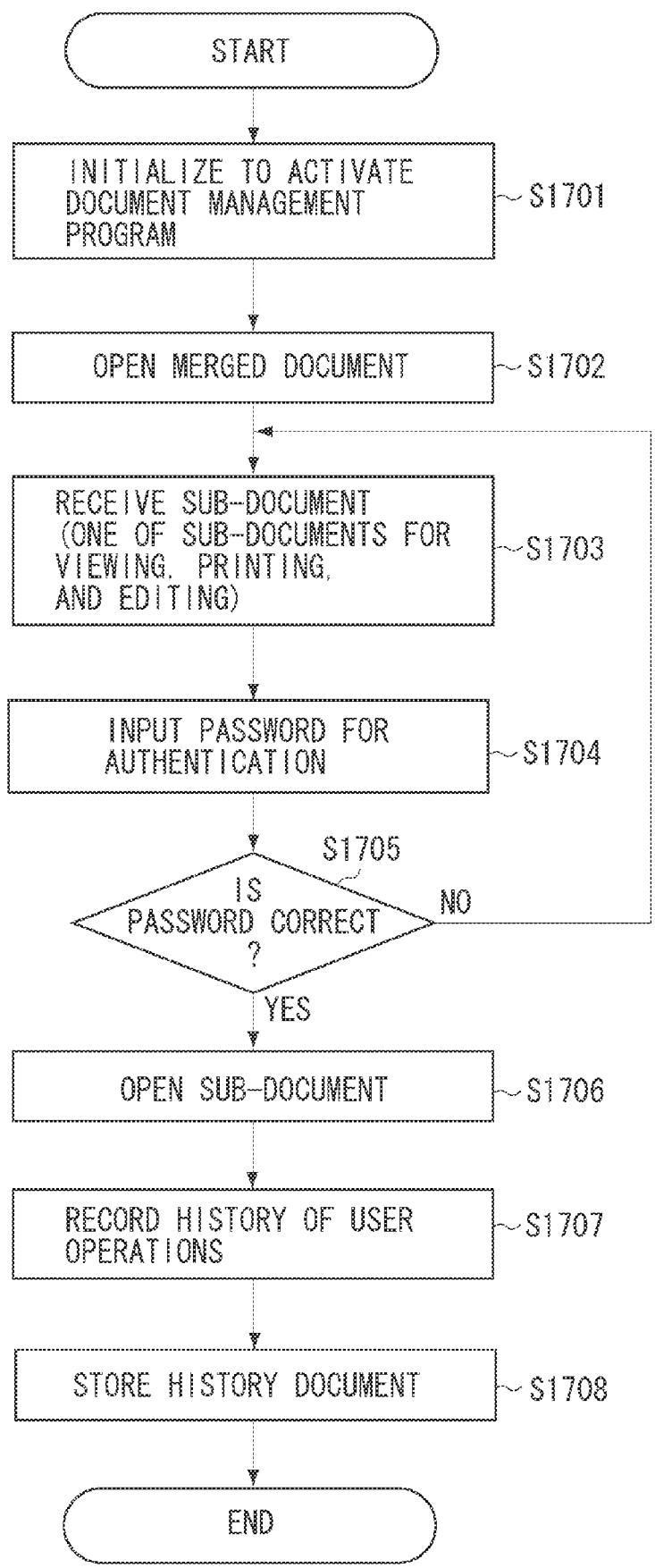
FIG. 17 is a flow chart illustrating processing by the user terminal.

Processing for various user operations (viewing, printing, and editing the document) when the user took out the document (the merged document 1500 registered for off-line take-out) that is made accessible even in the off-line environment will be described below with reference to FIG. 17.

This processing is performed under overall control of the CPU 200 of the user terminal. In step S1701, the user terminal performs necessary initialization processing to activate the document management program.

In step S1702, the user terminal opens the merged document 1500 selected by the user. When the merged document 1500 is opened, the screen of the display 207 displays the contents illustrated in FIG. 15. The merged document 1500 illustrated in FIG. 15 is displayed so that the user can easily understand the linking state of the sub-document 1501 with password for viewing, the sub-document 1502 with password for printing, and the sub-document 1503 with password for editing.

In step S1703, the user terminal receives a user-selected sub-document to be opened in the opened merged document 1500.

In step S1704, the user terminal displays a user interface requiring a password for opening the selected sub-document, and receives a password input from the user. In step S1705, the user terminal authenticates whether the input password is correct.

When the input password is correct (YES in step S1705), the processing proceeds to step S1706. In step S1706, the user terminal opens the sub-document specified in step S1703. When the password input by the user for operating a sub-document coincides with the password set in the sub-document, the user terminal determines that the user-input password is correct. On the other hand, when the input password is not correct (NO in step S1705), the processing returns to step S1703.

In step S1707, the user terminal records a history of user operations performed for the opened document. Once the document is opened, the user terminal recognizes that the document has been viewed and then records "Open" to a history document 1800 illustrated in FIG. 18 together with the date and time of operation.

Further, when the document is printed or edited, the user terminal records "Print" or "Edit", respectively, to the history document 1800 together with the date and time of operation. The record contents of the history document 1800 are not limited to the date and time and details of operation, but may be, for example, operation-related descriptions by the operator.

Figure 19:
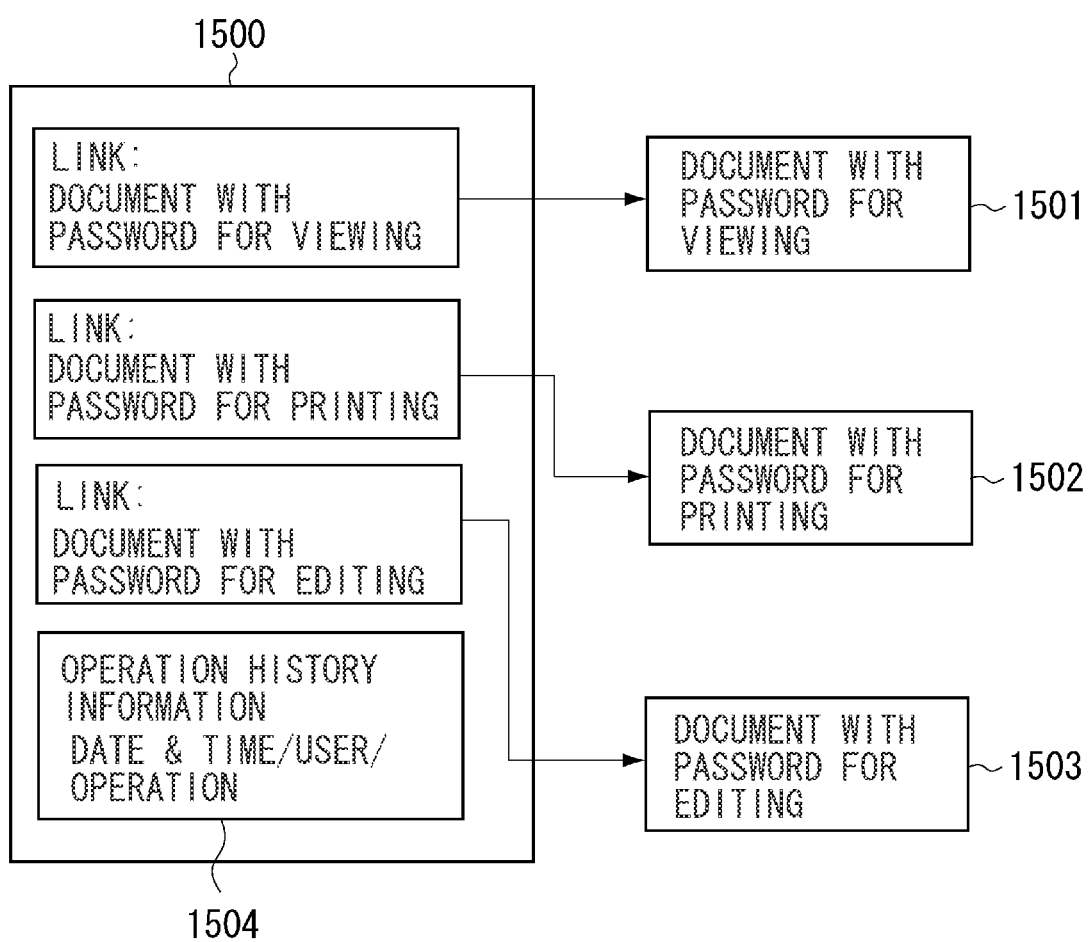
FIG. 19 illustrates an exemplary merged document to which a history document is added.

Then, when the user closes a document (merged document or any sub-document), the processing proceeds to step S1708. In step S1708, the user terminal stores in the merged document 1500 the history document 1800 created in step S1707 as a history document 1504, and the processing ends. FIG. 19 illustrates the merged document 1500 having a history document 1504 added thereto.

<Processing by Document Server 106 in End of OFF-Line Take-OUT>

Processing for returning the document (the merged document 1500 registered for off-line take-out) that is made accessible even in the off-line environment to the document server 106 will be described below with reference to FIG. 20. This processing is performed under overall control of the CPU 200 (including the CPU 200 of the access control management server 103 in a broad sense) of the document server 106.

In step S2001, when the document server 106 is accessed by a user operation, the document server 106 issues a login request to the access control management server 103. In step S2002, the document server 106 determines whether a take-out end request from the user is detected.

When the take-out end request is detected (YES in step S2002), the processing proceeds to step S2003. In step S2003, the document server 106 displays a list of merged documents 1500 currently being taken out. In step S2003, the document server 106 also receives a merged document 1500 selected by the user to end take-out.

In step S2004, the document server 106 issues a login request to the access control management server 103.

In step S2005, the document server 106 issues an access authority confirmation request to the access control management server 103. In this case, the access control management server 103 confirms whether a login user (a user who requested to access the document) has the editing authority for the document having an access control information setting. The access authorities include, for example, the viewing, editing, printing, and transmitting authorities for the document having an access control information setting.

In response to the access authority confirmation request, the access control management server 103 performs processing of steps S1014, S1015, and S1016 illustrated in FIG. 10. The processing of step S1016 enables the document server 106 to acquire a result of the access authority confirmation in response to the access authority confirmation request.

In step S2006, the document server 106 determines whether the login user can access the document for editing. When the document server 106 determines that the login user can access the document for editing (YES in step S2006), the processing proceeds to step S2007. On the other hand, when the document server 106 determines that the login user cannot access the document (NO in step S2006), the document server 106 notifies an error, and the processing returns to step S2002.

In step S2007, the document server 106 confirms whether the history document 1504 exists in the merged document 1500 and, if it exists, reflects the history included in the history document 1504 to the access control management server 103. More specifically, the document server 106 gives a history of viewing (when "Open" is recorded in the history document 1504) to original documents (documents merged into the merged document 1500) in the access control management server 103.

Likewise, the document server 106 gives a history of printing (when "Print" is recorded in the history document 1504) or a history of editing (when "Edit" is recorded in the history document 1504) to original documents in the access control management server 103. In step S2008, the document server 106 performs check-in processing for the merged document 1500. The check-in processing refers to processing for representing a state that the relevant merged document 1500 is not checked out.

In this way, at the time of off-line take-out, documents with password (for example, documents with password for viewing, password for printing, and password for editing) permitting each operation according to the type of access authority are generated based on a policy document, and the generated documents are merged so that it can be handled as one file. Further, operations performed in the off-line mode are recorded in an operation history and, when the on-line mode is restored, the operation history is recorded to the server.

This configuration enables, at the time of off-line take-out, giving necessary access authorities to the document, without generating a plurality of files, achieving appropriate file management (secure file management) even at the time of take-out. In other words, even in a situation where the access control management server 103 cannot limit operations to the document according to the access authority, operations to the document can be easily limited according to a plurality of types of access authorities set to each document. This configuration also enables reflecting the history of operations performed in the off-line mode to the server when the on-line mode is restored.

The present invention is achieved also by performing the following processing. Specifically, software (programs) for achieving the functions of the above-mentioned exemplary embodiment is supplied to a system or apparatus via a network or diverse memory media, and a computer (or CPU, MPU, etc.) of the system or apparatus reads and executes the programs.

While the present invention have specifically been explained based on the above-mentioned preferred exemplary embodiment, the present invention is not limited thereto but can be modified in diverse ways within the ambit of the appended claims.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-298621 filed Dec. 28, 2009, which is hereby incorporated by reference herein in its entirety.

What is claimed is:

1. A client apparatus comprising:
at least one processor; and
a memory storing instructions that, when executed by the at least one processor, causes the client apparatus to:
issue a request to confirm access authority for a document to a server apparatus for managing limitation of each operation to the document;
limit access to the document in accordance with a plurality of types of authorities set to the document as confirmed in response to the request, in a case where the server apparatus is able to limit the operation;
convert the document into a plurality of documents having a setting of each of the plurality of types of authorities to enable access to the document when the server apparatus is unable to limit the operation; and
merge the plurality of documents formed through the conversion, so as to be handled as one document, to generate one merged document.

2. The client apparatus according to claim 1, wherein the memory storing instructions that, when executed by the at least one processor, causes the client apparatus to: set a password corresponding to an authority of each of the plurality of documents when converting the document into a plurality of documents, and notify a user of a password corresponding to the authority.

3. The client apparatus according to claim 2, the memory storing instructions that, when executed by the at least one processor, further causes the client apparatus to: record, when the server apparatus cannot limit operations, a password is input by the user, and any one of the plurality of documents included in the merged document is operated, a history of each operation to the document.

4. The client apparatus according to claim 1, wherein the plurality of types of authorities include at least two of an authority to permit viewing, an authority to permit printing, an authority to permit editing, and an access authority to permit transmission.

5. A method comprising:
issuing a request to conform access authority for a document to a server apparatus for managing limitation of each operation to the document;
limiting access to the document in accordance with a plurality of types of authorities set to the document as confirmed in response to the request when the server apparatus is able to limit the operation;
converting, the document into a plurality of documents having a setting of each of the plurality of types of access authorities to enable access to the document when the server apparatus is unable to limit the operation; and
merging the plurality of documents formed through conversion, so as to be handled as one document, to generate one merged document.

6. A non-transitory computer-readable storage medium storing a computer program for making a computer execute a method, the method comprising:
issuing a request to conform access authority for a document to a server apparatus for managing limitation of each operation to the document;
limiting access to the document in accordance with a plurality of types of authorities set to the document as confirmed in response to the request when the server apparatus is able to limit the operation;

converting, the document into a plurality of documents having a setting of each of the plurality of types of access authorities to enable access to the document when the server apparatus is unable to limit the operation; and merging the plurality of documents formed through conversion, so as to be handled as one document, to generate one merged document.

\* \* \* \* \*